United States Patent
Brown

(10) Patent No.: US 7,500,322 B2
(45) Date of Patent: Mar. 10, 2009

(54) MEASURING DEVICE WITH MARKING HOLDER AND SHARPENER

(76) Inventor: Kent L. Brown, 1042 5th St., West Des Moines, IA (US) 50265

(*) Notice: Subject to any disclaimer, the term of this patent is extended or adjusted under 35 U.S.C. 154(b) by 0 days.

(21) Appl. No.: 11/277,441

(22) Filed: Mar. 24, 2006

(65) Prior Publication Data

US 2007/0220770 A1    Sep. 27, 2007

(51) Int. Cl.
*G01B 3/10* (2006.01)

(52) U.S. Cl. .............. 33/668; 33/768; D10/74

(58) Field of Classification Search .......... 33/668, 33/759, 760, 761, 768, 769, 770; D10/74; 7/160, 163; 30/459
See application file for complete search history.

(56) References Cited

U.S. PATENT DOCUMENTS

| | | | | |
|---|---|---|---|---|
| 1,655,429 A | * | 1/1928 | Mayhew | 33/27.02 |
| 2,069,619 A | * | 2/1937 | Mendelson | 30/459 |
| 2,807,886 A | * | 10/1957 | Aciego | 33/668 |
| 3,148,455 A | * | 9/1964 | Aciego | 33/668 |
| 4,296,554 A | * | 10/1981 | Hammerstrom | 33/32.5 |
| 4,744,150 A | * | 5/1988 | Horvath | 33/760 |
| 4,760,648 A | * | 8/1988 | Doak et al. | 33/668 |
| 4,766,673 A | * | 8/1988 | Bolson | 33/760 |
| 4,914,830 A | * | 4/1990 | Legare | 33/668 |
| 4,964,225 A | * | 10/1990 | Waldherr | 33/768 |
| 5,040,256 A | * | 8/1991 | Mills | 7/164 |
| 5,154,006 A | * | 10/1992 | Wooster | 33/768 |
| 5,172,486 A | * | 12/1992 | Waldherr | 33/770 |
| D339,536 S | * | 9/1993 | Ribron | D10/72 |
| 5,263,259 A | * | 11/1993 | Cimador | 33/41.4 |
| D365,366 S | * | 12/1995 | Cerrato | D19/73 |
| 5,513,436 A | * | 5/1996 | Cerrato | 30/459 |
| 5,599,123 A | * | 2/1997 | Still | 401/52 |
| 5,671,543 A | * | 9/1997 | Sears | 33/668 |
| D390,795 S | * | 2/1998 | LaFrance | D10/74 |
| 5,735,052 A | * | 4/1998 | Lin | 33/27.03 |
| 5,845,412 A | * | 12/1998 | Arcand | 33/758 |
| 6,223,443 B1 | * | 5/2001 | Jacobs | 33/27.03 |
| 6,233,789 B1 | * | 5/2001 | Douglas | 24/3.12 |
| 6,553,631 B1 | * | 4/2003 | Douglas | 24/3.12 |
| 6,574,881 B2 | * | 6/2003 | Cole, III | 33/668 |
| D479,477 S | * | 9/2003 | Pereczon | D10/74 |
| 6,910,280 B2 | | 6/2005 | Scarborough | |
| 6,931,734 B2 | | 8/2005 | Elder et al. | |
| 6,935,045 B2 | | 8/2005 | Cubbedge | |
| 6,938,354 B2 | | 9/2005 | Worthington | |
| 6,941,672 B2 | | 9/2005 | Scarborough | |
| 6,996,915 B2 | | 2/2006 | Ricalde | |
| 2002/0011006 A1 | * | 1/2002 | Smith | 33/668 |
| 2005/0283987 A1 | * | 12/2005 | Nash | 33/286 |
| 2007/0220770 A1 | * | 9/2007 | Brown | 33/668 |

FOREIGN PATENT DOCUMENTS

| | | | | |
|---|---|---|---|---|
| DE | 4432697 A | * | 3/1996 |
| GB | 1534971 A | * | 12/1978 |
| GB | 2359366 A | * | 8/2001 |
| GB | 2380164 A | * | 4/2003 |

* cited by examiner

*Primary Examiner*—R. A. Smith

(57) ABSTRACT

A measuring device having a flexible tape resiliently coiled within a housing. Mounted to the housing is a retaining block. The block has a groove for frictionally receiving a marking tool. Also, connected to the block is a sharpening device.

5 Claims, 2 Drawing Sheets

MEASURING DEVICE WITH MARKING HOLDER AND SHARPENER

BACKGROUND OF THE INVENTION

The invention is directed to a marking device, and more particularly a marking device with a marking holder and sharpener.

Marking devices are well known in the art. One example is known as a "tape measure". Tape measures typically include a flexible tape resiliently coiled within a housing. The tape is normally printed with incremental measuring marks for measuring distances. In use, the flexible tape is uncoiled and extended from the housing and placed on a surface to be measured. Distances can then be marked with a separate marking tool, such as a pencil, directly onto the surface measured.

Numerous marking devices incorporate marking tools inside and outside the housing. A problem with these devices is that it is difficult to sharpen the marking tool in order to make a clean and accurate mark. In some devices the measuring device must be disassembled and the marking tool replaced. As a result a need exists in the art for a measuring device that addresses these problems.

An objective of the present invention is to provide a measuring device that is more convenient to use.

Another objective of the present invention is to provide a measuring device that will hold and sharpen a marking tool.

These and other objectives will be apparent to those skilled in the art based on the following written description.

SUMMARY OF THE INVENTION

A measuring device having a flexible tape resiliently coiled within a housing. Mounted to the housing is a retaining block. The block has a groove for frictionally receiving a marking tool. Also, connected to the block is a sharpening device.

DETAILED DESCRIPTION OF THE PREFERRED EMBODIMENT

Figure 1:
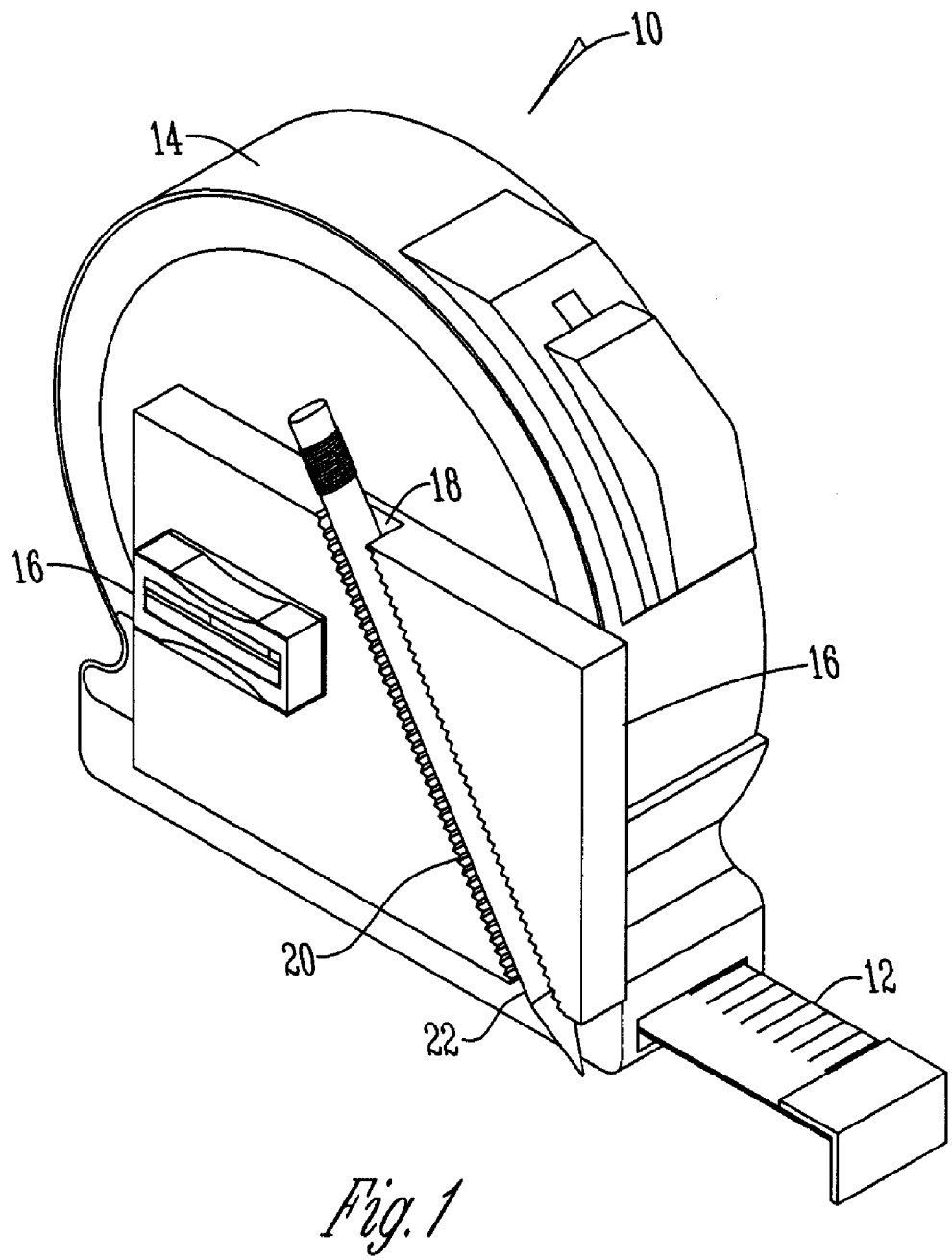
FIG. 1 is a perspective view of a measuring device.
Figure 2:
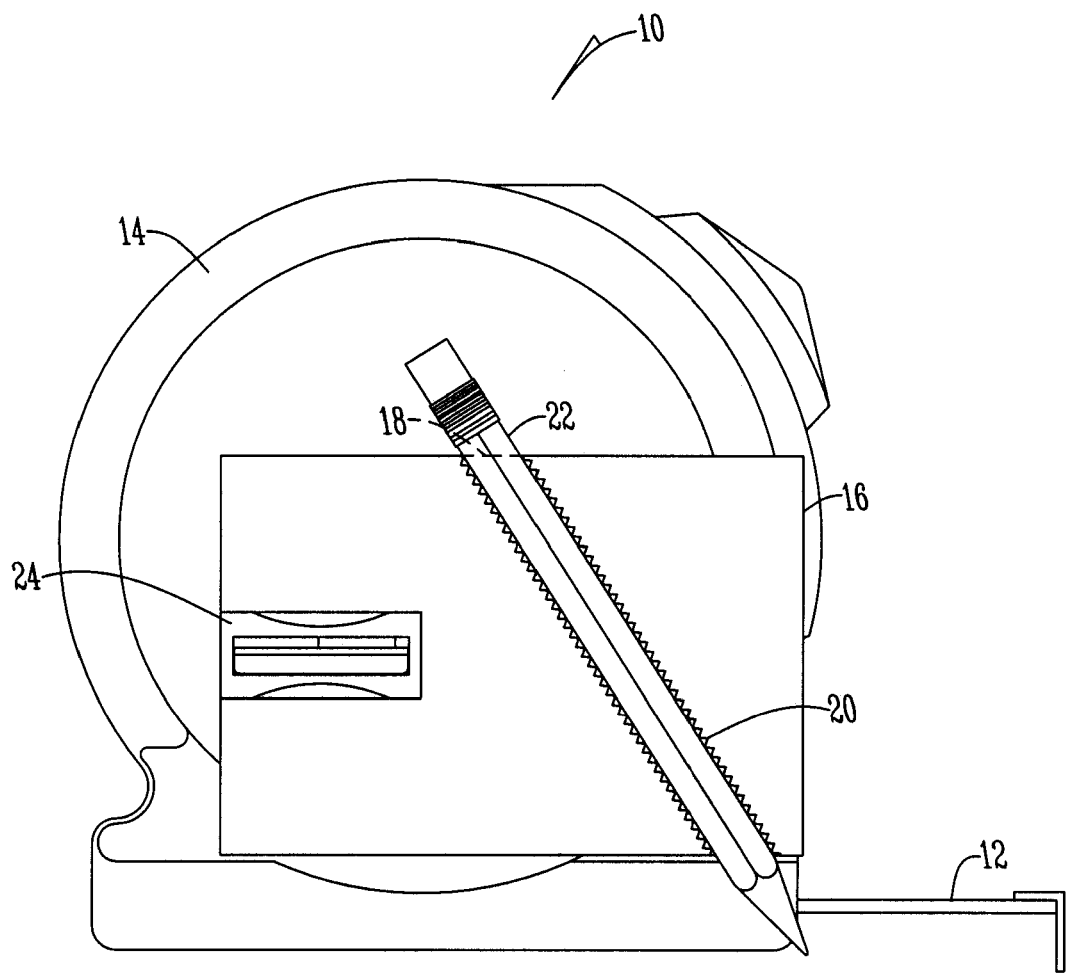
FIG. 2 is a side view of a measuring device.

Referring to the Figures, a measuring device 10, has a flexible tape 12 resiliently coiled within a housing 14. The marking device 10 shown in the Figures is a conventional tape measure and is shown as an example only. The invention may be incorporated into any measuring device without departing from the scope or the spirit of the invention.

Mounted to the housing 14 is a retaining block 16. The retaining block 16 is of any shape and size and is mounted to the housing 14 in any conventional manner such as with an adhesive, screws, weld mount, or the like. Alternatively, the retaining block 16 is integrally molded as part of the housing 14.

The retaining block 16 has a retaining groove 18 disposed therein. In one embodiment, the groove is open and has a rigid surface 20 that is sized to receive and frictionally retain a marking tool 22 such as a pencil. Alternatively, the groove is enclosed with open ends and is sized to receive and retain the marking tool 22 when it is slid in one end. The block 16 and groove 18 are positioned such that a marking tip of the marking tool 22 is adjacent the tape 12 to mark the measured surface without removing the marking tool 22 from the groove 18.

Mounted to the retaining block 16 is a sharpening device 24 such as a pencil sharpener. The sharpening device 24 is mounted to the retaining block in any conventional manner such as by adhesive, screws, a weld mount, or the like. Alternatively, the sharpening device 24 is disposed within the retaining block 16 either received within a slot or integrally molded as part of the retaining block 16.

In use, the tape 12 of the measuring device 10 is extended and laid on a surface to be measured. To mark the surface, the marking tool 22 is removed from the retaining groove 18 and the surface is manually marked. Alternatively, the marking tool 22 is positioned within groove 18 such that the tip of the marking tool 22 is adjacent the tape 12 and a mark is made on the measured surface without removing the marking tool 22 from the groove 18. As the marking tool 22 becomes dull it is removed from groove 18 and inserted within the sharpening device 24 and sharpened. Once sharpened, the marking tool 22 is returned to the retaining groove 18 until needed to mark.

Thus, a measuring device has been described that, at the very least, meets all the stated objectives.

What is claimed is:

1. A measuring device comprising:
   a tape measure having a housing containing a flexible tape,
   a retaining block mounted to the housing, a sharpening device mounted to the retaining block; the retaining block having a diagonal retaining groove disposed within the retaining block
   a marking tool having a marking tip frictionally received within the diagonal retaining groove wherein the marking tool is positioned such that the marking tip is adjacent the flexible tape to allow a mark to be made on a measured surface without removing the marking tool from the diagonal retaining groove.

2. The device of claim 1 wherein the retaining block is integrally molded as part of the housing.

3. The device of claim 1 wherein the sharpening device is disposed within the retaining block.

4. The device of claim 1 wherein the retaining groove has a rigid surface.

5. The device of claim 1 wherein the retaining groove is open.

* * * * *